(12) United States Patent
Prather et al.

(10) Patent No.: US 6,832,033 B2
(45) Date of Patent: Dec. 14, 2004

(54) HETERO-STRUCTURE PHOTONIC BANDGAP MATERIALS

(75) Inventors: Dennis W. Prather, Landenburg, PA (US); Ahmed Samir Sharkawy, Newark, DE (US); Shouyun Shi, Newark, DE (US)

(73) Assignee: The University of Delaware, Newark, DE (US)

( * ) Notice: Subject to any disclaimer, the term of this patent is extended or adjusted under 35 U.S.C. 154(b) by 227 days.

(21) Appl. No.: 10/166,843

(22) Filed: Jun. 11, 2002

(65) Prior Publication Data

US 2003/0016915 A1 Jan. 23, 2003

Related U.S. Application Data

(60) Provisional application No. 60/297,390, filed on Jun. 11, 2001.

(51) Int. Cl.[7] .................................................. G02B 6/10
(52) U.S. Cl. ........................................ 385/129; 385/14
(58) Field of Search .................. 385/146, 14, 129–132; 359/321

(56) References Cited

U.S. PATENT DOCUMENTS 5,999,308 A 12/1999 Nelson et al.
6,618,535 B1 * 9/2003 Reynolds ..................... 385/129

OTHER PUBLICATIONS

Loncar et al., "Design and Fabrication of Silicon Photonic Crystal Optical Waveguides", Oct. 2000, Journal of Lightwave Technology vol. 18 No. 10, p1402–1411.*
N.W. Ashcroft et al., *Solid State Physics* (1976).
E. Yablonovitch, "Inhibited Spotaneous Emission in Solid--State Physics and Electronics," *Physical Review Letters*, vol. 58, No. 20, pp. 2059–2062 (May 1987).
S. John, "Strong Localization of Photonics in Certain Disordered Dielectric Superlattices," *Physical Review Letters*, vol. 58, No. 23, pp. 2486–2489 (Jun. 1987).
K.M. Leung et al., "Photon band structures: The plane–wave method," *Physical Review B*, vol. 41, No. 14, pp. 10188–10190 (May 1990).
Z. Zhang et al., "Electromagnetic Wave Propagation in Periodic Structures: Bloch Wave Solution of Maxwell's Equations," *Physical Review Letters*, vol. 65, No. 21, pp. 2650–2653 (Nov. 1990).
K.M. Ho et al., "Existance of a Photonic Gap in Periodic Dielectric Structures," *Physical Review Letters*, vol. 65, No. 25, pp. 3152–3155 (Dec. 1990).
K.S. Kunz et al., *The Finite Difference Time Domain Method for Electromagnetics* (1993).
J.P. Berenger, "A Perfectly Matched Layer for the Absorption of Electromagnetic Waves," *J. Comp. Physics*, vol. 114, pp. 185–200 (1994).
A. Mekis et al., "High Transmission through Sharp Bends in Photonic Crystal Waveguides," *Physical Review Letters*, vol. 77, No. 18, pp. 3787–3790 (Oct. 1996).

(List continued on next page.)

Primary Examiner—Diane I. Lee
Assistant Examiner—Lisa M. Caputo
(74) Attorney, Agent, or Firm—Connolly Bove Lodge & Hutz LLP

(57) ABSTRACT

A two-dimensional, hetero-structure photonic crystal includes a first rectangular lattice array of dielectric rods provided on a portion of an air background, and a second rectangular lattice array of dielectric rods provided on another portion of the air background. The two-dimensional, hetero-structure photonic crystal provides the advantages of both the rectangular and triangular lattice arrays for application with optical beam splitters and combiners, and achieves a transmission efficiency greater than 90% in comparison to the transmission efficiency of 50% for the conventional uni-structure photonic crystals.

10 Claims, 3 Drawing Sheets

OTHER PUBLICATIONS

H. Kosaka et al., "Superprism phenomena in photonic crystals," *Physical Review B*, vol. 58, No. 16, pp. R10096–R10099 (Oct. 1998).

L. Liu et al., "Photonic band structure in the nearly plane wave approximation," *Eur. Phys. J. B*, vol. 9, pp. 381–388 (1999).

R.W. Ziolkowski, et al., "FDTD analysis of PBG waveguides, power splitters and switches," *Optical and Quantum Electronics*, vol. 31, pp. 843–855 (1999).

J. N. Winn et al., "Interband transitions in photonic crystals," *Physical Review B*, third series, vol. 59, No. 3, pp. 1551–1554 (Jan. 1999).

H. Kosaka et al., "Photonic crystals for micro lightwave circuits using wavelength–dependent angular beam steering," *Applied Physics Letters*, vol. 74, No. 10, pp. 1370–1372 (Mar. 1999).

H. Kosaka et al., "Self–collimating phenomena in photonic crystals," *Applied Physics Letters*, vol. 74, No. 9, pp. 1212–1214 (Mar. 1999).

F.R. Mendieta et al., "Surface electromagentic waves in two–dimensional photonic crystals, Effect of the position of the surface plane," *Physical Review B*, vol. 59, No. 23, pp. 15112–15120 (Jun. 1999).

R. Stoffer et al., "Numerical Studies of 2D photonic crystals: Waveguides, coupling between waveguides and filters," *Optical and Quantum Electronics*, vol. 32, pp. 947–961 (2000).

A. Taflove et al., *Computational Electrodynamics: The Finite–Different Time–Domain Method*, 2d. ed. (2000).

H. Benisty et al., "Radiation losses of waveguide–based two–dimensional photonic crystals: Positive role of the substrate," *Applied Physics Letters*, vol. 76, No. 5, pp. 532–534 (Jan. 2000).

M. Tokushima et al., "Lightwave propagation through a 120° sharply bent single–line–defect photonic crystal waveguide," *Applied Physics Letters*, vol. 76, No. 8, pp. 952–954 (Feb. 2000).

C. Zhang et al., "Enlargement of nontransmission frequency range in photonic crystals by using multiple heterostructures," *J. Applied Physics*, vol. 87, No. 6, pp. 3174–3176 (Mar. 2000).

M. Bayindir et al., "Propagation of photons by hopping: A waveguiding mechanism through localized coupled cavities in three–dimensional photonic crystals," *Physical Review B*, vol. 61, No. 18, pp. R11855–R11858 (May 2000).

A.R. McGurn, "Photonic crystal circuits: A theory for two– and three–dimensional networks," *Physical Review B*, vol. 61, No. 19, pp. 13235–13249 (May 2000).

T. Søndergaard et al., "Energy flow in photonic crystal waveguides," *Physical Review B*, vol. 61, No. 23, pp. 15688–15696 (Jun. 2000).

A. Adibi et al., "Design of photonic crystal optical waveguides with singlemode propagation in the photonic bandgap," *Electronic Letters*, vol. 36, No. 16, pp. 1376–1378 (Aug. 2000).

G. Parker et al., "Photonic crystals," *Physics World* (Aug. 2000).

T. Søndergaard et al., "Designing finite–height two–dimensional photonic crystal waveguides," *Applied Physics Letters*, vol. 77, No. 6, pp. 785–787 (Aug. 2000).

S.G. Johnson et al., "Linear waveigdes in photonic–crystal slabs," *Physical Review B*, vol. 62, No. 12, pp. 8212–8222 (Sep. 2000).

M. Lončar et al., "Design and Fabrication of Silicon Photonic Crystal Optical Waveguides," *J. Lightwave Tech.*, vol. 18, No. 10, pp. 1402–1411 (Oct. 2000).

A. Adibi et al., "Properties of the Slab Modes in Photonic Crystal Optical Waveguides," *J. Lightwave Tech.* vol. 18, No. 11, pp. 1554–1564 (Nov. 2000).

M. Bayindir et al., "Photonic–crystal–based beam splitters," *Applied Physics Letters*, vol. 77, No. 24, pp. 3902–3904 (Dec. 2000).

L.L. Lin et al., "Interface states in photonic crystal heterostructures," *Physical Review B*, vol. 63 pp. 33310–1 thru 33310–4 (2001).

A Sharkawy et al., "Optical Networks on a Chip using Photonic Bandgap Materials," presented at SPIE 46th annual meeting, San Diego, California (2001).

S. Yano et al., "Quantized state in a single quantum well structure of photonic crystals," *Physical Review B.*, vol. 63, pp. 153316–1 thru 153316–4 (2001).

W. Zhang et al., "Multiple scattering theory and its application to photonic band gap systems consisting of coated spheres," *Optics Express*, vol. 8, No. 3, pp. 203–208 (Jan. 2001).

A. Sharkawy et al., "Multichannel wavelength division multiplexing with photonic crystals," *Applied Optics*, vol. 40, No. 14, pp. 2247–2252 (May 2001).

A. Mekis et al., "Tapered Couplers for Efficient Interfacing Between Dielectric and Photonic Crystal Waveguides," *J. Lightwave Tech*, vol. 19, No. 6, pp. 861–865 (Jun. 2001).

D.W. Prather et al., "Electro–Optical 2×2 Switching in a Photonic Bandgap Waveguided Coupler," presented at WDM and photonic switching devices for network applications III, San Jose, California (2002).

A. Sharkawy et al., "Analysis and Applications of Photonic Crystal Coupled Waveguide Theory," presented at Photonic Bandgap Materials and Devices, San Jose, California (2002).

\* cited by examiner

HETERO-STRUCTURE PHOTONIC BANDGAP MATERIALS

CLAIM FOR PRIORITY

The present application claims priority of U.S. Provisional Patent Application Ser. No. 60/297,390, filed Jun. 11, 2001 the disclosure of which being incorporated by reference herein in its entirety.

BACKGROUND OF THE INVENTION

A. Field of the Invention

The present invention relates generally to photonic bandgap materials (also known as photonic crystals), and, more particularly to hetero-structure photonic bandgap materials.

B. Description of the Related Art

During the last decade photonic crystals have risen from an obscure technology to a prominent field of research. In large part this is due to their unique ability to control, or redirect, the propagation of light. E. Yablonovich, "Inhibited spontaneous emission in solid-state physics and electronics," *Physical Review Letters*, vol. 58, pp. 2059–2062 (May 1987), and S. John, "Strong localization of photons in certain disordered dielectric superlattices," *Physical Review Letters*, vol. 58, pp. 2486–2489 (June 1987), initially proposed the idea that a periodic dielectric structure can possess the property of a bandgap for certain frequencies in the electromagnetic spectra, in much the same way as an electronic bandgap exists in semiconductor materials. This property affords photonic crystals with a unique ability to guide and filter light as it propagates within it. Thus, photonic crystals have been used to improve the overall performance of many optoelectronic devices.

The concept of a photonic bandgap material is as follows. In direct conceptual analogy to an electronic bandgap in a semiconductor material, which excludes electrical carriers having stationary energy states within the bandgap, a photonic bandgap in a dielectric medium excludes stationary photonic energy states (i.e., electromagnetic radiation having some discrete wavelength or range of wavelengths) within that bandgap. In semiconductors, the electronic bandgap results as a consequence of having a periodic atomic structure upon which the quantum mechanical behavior of the electrons in the material must attain eigenstates. By analogy, the photonic bandgap results if one has a periodic structure of a dielectric material where the periodicity is of a distance suitable to interact periodically with electromagnetic waves of some characteristic wavelength that may appear in or be impressed upon the material, so as to attain quantum mechanical eigenstates.

A use of these materials that can be envisioned, is the optical analog to semiconductor behavior, in which a photonic bandgap material, or a plurality of such materials acting in concert, can be made to interact with and control light wave propagation in a manner analogous to the way that semiconductor materials can be made to interact with and control the flow of electrically charged particles, i.e., electricity, in both analog and digital applications. Photonic crystals have been used to improve the overall performance of many optoelectronic devices.

Optimizing the performance of a Photonic Integrated Circuit (PIC) in a single crystalline photonic crystal structure (unistructure) continues to be a challenge, due to the spatial constraint of the unistructure. This limitation, namely single crystalline structures, has a pronounced impact over the bandgap size, throughput efficiency, and back reflections that arise due to spatial mismatches at transitions between different Photonic crystal sections such as straight and angular waveguides.

Conventional two-dimensional photonic crystals have been formed from an evenly-spaced triangular lattice array of rods, each rod having a dielectric constant, and a background material surrounding the rods and having a dielectric constant different than the dielectric constant of the rods. Such a triangular lattice array photonic crystal is shown, for example, in FIG. 2 of U.S. Pat. No. 5,999,308. As shown in this patent, the triangular array consists of rows of rods, wherein adjacent rows of rods are offset from each other such that a rod from one row lies between two rods on an adjacent row in the z-direction.

A. Computational Method

The method initially used for theoretical analyses of photonic crystal structures is the plane-wave expansion method, which makes use of the fact that; eigenmodes in periodic structures can be expressed as a superposition of a set of plane waves. Using this approach, photon dispersion relations inside photonic crystal structures have been calculated. While this method can ensure an accurate solution for the dispersion properties of a photonic crystal structure, it is still limited due to the fact that transmission spectra, field distribution, and back reflections cannot be extracted, since it only considers propagating modes, whereas in a finite crystal there are also evanescent modes.

An alternative approach, which has been widely adopted in calculating both transmission spectra and field distribution, is based on numerical solutions of Maxwell equations using the finite-difference time-domain (FDTD) method. In particular, FDTD has been used to analyze multi-channel drop/add filters as well as other photonic crystal devices, to calculate transmission through sharp bends, and to study waveguiding mechanism through localized coupled cavities in three-dimensional photonic crystals.

To examine the FDTD method, a two-dimensional photonic crystal of a square lattice with a lattice constant $\alpha=543$ nm may be considered. The lattice may include dielectric rods with a dielectric constant of $\epsilon_r=11.56$ and radius $r=109$ nm, in an air background. The transmission spectrum for this structure may be obtained using FDTD with periodic boundary conditions. The structure has a bandgap between $\lambda=1.234\ \mu m$ and $\lambda=2.172\ \mu m$, for TM (transverse magnetic field) polarization. A beam splitter may be implemented in the structure to calculate its overall throughput efficiency.

B. Unistructure Beam Splitter

A common use for photonic crystals in integrated optical applications is that of an optical beam splitter and/or combiner. An optical beam splitter divides an optical beam into multiple signals for density routing. The split beam can then be recombined back into a single beam or further guided to another point with an optical beam combiner, depending upon the application. Presently, these operations have been hindered by the spatial constraints of the single crystalline structure, which in some cases limit their ability to efficiently perform their intended functions. Limitations such as back reflections, frequency selectivity, and/or bi-directionality of certain devices may have a pronounced impact on the performance and operation of some photonic integrated circuits. The hetero-structure photonic crystal devices of the present invention overcome these limitations, in addition to enhancing throughput efficiency as well as minimizing back reflections.

A conventional two-dimensional photonic crystal is the Cartesian lattice array 10 shown in FIG. 1. The Cartesian lattice array 10 may be a square array or rectangular array and is formed from evenly-spaced columns and rows of rods 12, each rod 12 having a dielectric constant, and background material 14 surrounding rods 12 and having a dielectric constant different than the dielectric constant of rods 12. As shown in FIG. 1, the Cartesian lattice array 10 consists of rows and columns of rods 12, wherein adjacent rows and columns of rods 12 are evenly spaced from each other in both the x-direction and the z-direction. As will be described more fully below, a line defect may be formed in Cartesian lattice array photonic crystal 10 by removing a portion of a column of dielectric rods 12 from the photonic crystal 12. This creates a main waveguide 16 within the photonic crystal 10.

The unistructure optical beam splitter 10 shown in FIG. 1 consists of silicon posts 12 (having a dielectric constant $\in_r=11.56$) arranged on a rectangular lattice in air background 14 (having a dielectric constant $\in_b=1.0$). The photonic crystal structure 10 possesses a bandgap between $\lambda=1.234$ $\mu$m and $\lambda=2.172$ $\mu$m for TM polarization. An optical beam splitter (Y coupler) 10 consists of two basic elements, a waveguiding element 16 and wavesplitting elements 18, 20. Creating a straight-line defect in a photonic crystal forms the waveguiding element 16, while creating an angular line defect forms the wavesplitting elements 18, 20. Such that each wavesplitting element makes 45° from the main waveguiding element 16 as shown in FIG. 1. Line defects can be created by either adding or removing high-index material, altering the effective index of the waveguide in comparison to its surroundings. In the structure 10 of FIG. 1 a row of dielectric posts was removed to create an acceptor type waveguide. Adding high-index material to the waveguiding region creates donor type waveguides.

An incident plane wave of normal incidence with a frequency profile within the bandgap of the photonic crystal structure may be used to excite the input waveguide 16 of the Y coupler 10. A detector may be placed inside each waveguide channel 18, 20 of the splitter 10, the time varying electric field measured, and then compared to the incident field in the main channel (input) 16, to calculate the throughput efficiency. The structure shown in FIG. 1 was simulated using two-dimensional FDTD along with Perfectly Matched Layer (PML) absorbing boundary conditions to truncate the computational region and minimize the reflections from the outer boundary. A pulse of center wavelength $\lambda=1.55$ $\mu$m and pulse width $\Delta\lambda=0.5$ $\mu$m incident through the main waveguiding element 16 should ideally split with 50% transmission efficiency on either side of the splitting element. Comparing the amplitude of the time varying electric field stored at the detectors placed inside each waveguide channel 18, 20 of the splitter 10, with the amplitude of the incident field through the main waveguide channel 16, the transmission efficiency in each channel 18, 20 was numerically calculated to be about 25% for frequencies within the bandgap of the structure, and the overall throughput efficiency was 50% through both channels. The same holds true for the unistructure (triangular lattice array photonic crystal) shown in FIG. 2 of U.S. Pat. No. 5,999,308.

A considerable amount of loss was numerically measured (3 dB), which is mainly due to back reflections at the transition between the waveguiding section 16 and the wavesplitting sections 18, 20, as well as bending losses at the corner joints between the angular and straight waveguide sections. Such losses caused a mismatch between the waveguiding section 16 and the wavesplitting sections 18, 20, and hence reduced the overall throughput efficiency of the unistructure beam splitter. In other words, due to geometrical limitations of the rectangular grid 12 on which the rectangular photonic crystal lattice was formed, unistructure beam splitter 10 did not achieve its predicted performance. Even though other approaches were successfully capable of achieving better performance than the device 10 analyzed above, they still suffered from other issues such as waveguide directivity, that is, being a bi-directional waveguide instead of a unidirectional one. In addition, other approaches use a frequency selective waveguide instead of a broadband one, using localized point defects to enhance the overall throughput efficiency of such devices. Such techniques are better utilized for narrowband or selectively coupled devices, while their performance for broadband devices may not be optimal.

Thus there is a need in the art to provide a photonic crystal lattice arrangement that increases the transmission efficiency of light through the crystal above the transmission efficiencies encountered with the conventional unistrucuture lattices described above.

SUMMARY OF THE INVENTION

The present invention satisfies this need by providing a two-dimensional, hetero-structure photonic crystal that includes a hybrid combination of rectangular and triangular lattice arrays of dielectric rods.

The two-dimensional, hetero-structure photonic crystal of the present invention provides the advantages of both the rectangular and triangular lattice arrays for application with optical beam splitters (also known as Y couplers) and combiners. The two-dimensional, hetero-structure photonic crystal of the present invention achieved a transmission efficiency greater than 90% in comparison to the transmission efficiency of 50% for the conventional uni-structure photonic crystals.

Additional advantages of the invention will be set forth in part in the description which follows, and in part will be learned from the description, or may be learned by practice of the invention. The advantages of the invention will be realized and attained by means of the elements and combinations particularly pointed out in the appended claims.

In accordance with the purpose of the invention, as embodied and broadly described herein, the invention comprises a two-dimensional, hetero-structure photonic crystal, comprising: a rectangular lattice array of dielectric rods provided on a portion of an air background; and a triangular lattice array of dielectric rods provided adjacent to said rectangular lattice array, wherein a main waveguide is formed in said rectangular lattice array by removing dielectric rods from portions thereof, and a plurality of splitting channel waveguides are formed in said triangular lattice array by removing dielectric rods from portions thereof, each of the plurality of splitting channel waveguides optically communicating with the main waveguide.

Further in accordance with the purpose, the invention comprises A method of making a two-dimensional, hetero-structure photonic crystal, comprising: forming a rectangular lattice array of dielectric rods on a portion of an air background; forming a triangular lattice array of dielectric rods provided adjacent to said rectangular lattice array; forming a main waveguide in the rectangular lattice array by removing dielectric rods from portions thereof; and forming a plurality of splitting channel waveguides in the triangular lattice array by removing dielectric rods from portions thereof, each of the plurality of splitting channel waveguides optically communicating with the main waveguide.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

DETAILED DESCRIPTION OF THE PRESENT INVENTION

Figure 1:
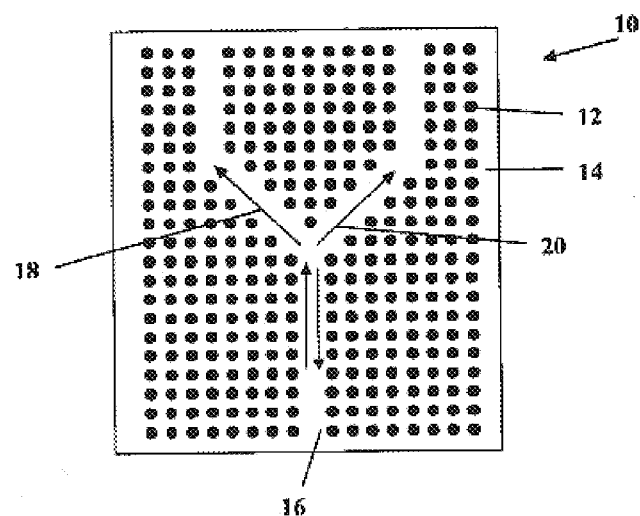
FIG. 1 is a top view of a conventional two-dimensional, unistructure (Cartesian lattice array) photonic crystal that is used as an optical beam splitter.

Reference will now be made in detail to the present preferred embodiment of the invention, an example of which is illustrated in the accompanying drawings. Wherever possible, the same reference numbers will be used throughout the drawings to refer to the same or like parts.

As used herein, the expression "optically communicates" refers to any connection, coupling, link or the like by which optical signals carried by one optical system element are imparted to the communicating element.

A. Localization of Light in Photonic Crystals

The physical phenomena that clearly describes the operation of a photonic crystal is the localization of light, which is achieved from the scattering and interference produced by a coherent wave in a periodic structure. In this case a photon located in a lossless dielectric media provides an ideal realization of a single excited state in a static medium at room temperature. To describe this phenomenon, Maxwell's equations are cast into a form similar to Schrodinger's equations to produce the following Equation (1):

$$\nabla \times (\nabla \times E(r)) = \left(\frac{\omega}{c}\right)^2 \varepsilon(r) E(r), \qquad (1)$$

where E(r) is the electric field, ω is the angular frequency, c is the velocity of light, ∈(r) is the dielectric function, and r is the position vector. The permittivity can be described as:

$$\in(r) = \in_{av} + \in_{spatial}(r), \qquad (2)$$

where $\in_{av}$ is the average value of the dielectric function, and $\in_{spatial}(r)$ is the spatial component of the dielectric function, which is analogous to the potential in Schrodinger's equation. In a photonic crystal there exists a dielectric band and an air band, analogous to the valance band and the conduction band, respectively, in a semiconductor material. Between the dielectric and air bands is the photonic bandgap, within which no energy states (or photonic frequencies) exist and, as a result, propagation is prohibited.

Equation (1) defines the main design parameters associated with a photonic crystal, such as the fill factor (defined as the ratio of the area of the unit lattice filled by dielectric to the total area of the entire unit lattice of a Photonic crystal), the refractive index contrast between the dielectric material and the host material, the ratio of the lattice constant to the radius of the cylinders (for the case of cylindrical rods), and the wavelength to lattice constant ratio. These parameters define the location and size of the bandgap, and whether a bandgap may or may not exist for a specific polarization, such as: (1) transverse electric polarization (TE), where the To electric field is orthogonal to the plane of incidence; or (2) transverse magnetic polarization (TM), where the magnetic field is orthogonal to the plane of incidence.

The spatial localization of light in a photonic crystal is achieved by introducing defects, which can take the form of a line defect or a point defect. In the case of a line defect, the photons that lie within the bandgap are not allowed to propagate through the crystal. As a result, they are confined to the defect region, which therefore behaves similar to a waveguide. In the case of a point defect, the photonic crystal creates a localized state, or cavity, that confines a single or a multiple of closely separated modes to the spatial location of the defect. The following section discusses in detail the introduction of point defects into a photonic crystal to create microcavities.

B. Doping of Photonic Crystals

Doping of a semiconductor material may be achieved by either adding a donor or an acceptor atom into the material. Both result in a change in the electrical properties of the semiconductor material to produce either a p-type or an n-type material. In a similar fashion, the optical properties of a photonic crystal can be changed by introducing point defects into the crystal by either adding or removing a certain amount of dielectric material from the crystal.

When adding dielectric material to a unit cell of photonic crystal, the dielectric material behaves like a donor atom in a semiconductor, which corresponds to a donor mode and has its origin at the bottom of the band of the photonic crystal. Alternatively, removing dielectric material from a unit cell behaves like an acceptor atom in an atomic crystal, which corresponds to an acceptor mode and has its origins at the top of the band of the photonic crystal. Consequently, acceptor modes are preferable for making single mode laser microcavities, since they allow a single localized mode to oscillate in the cavity. By adding or removing a certain amount of dielectric material to or from the photonic crystal, the symmetry of the photonic lattice is disrupted, which allows for a single state, or multiple closely-separated states, to exist within the bandgap.

C. Two-dimensional, Hetero-structure Photonic Crystals

When a photonic crystal of single crystalline structure is formed, there is a natural matching of the crystal lattice, and high quality single crystal layers result. On the other hand, if a photonic crystal is formed from multiple crystalline structures, (e.g. rectangular, triangular), the newly created structure is no longer a single crystalline structure but a hybrid structure which in turn carries the optical characteristics of both structures. This can be accomplished under the constraints that both structures used to build the hetero-structure, have nearly matched bandgap sizes. Otherwise, internal mismatches at the interface between the different lattice structures will occur.

1. Bandgap Modulation by Photonic Crystal Hetero-structure

When two photonic crystal lattices of different crystalline structures are brought together, they form a hetero-structure lattice. The interface between two such lattices may be virtually free of matching defects, and continuous crystals containing single or multiple hetero-structures can be formed. The theoretical analysis of hetero-structure photonic crystals will be presented first.

Figure 2:
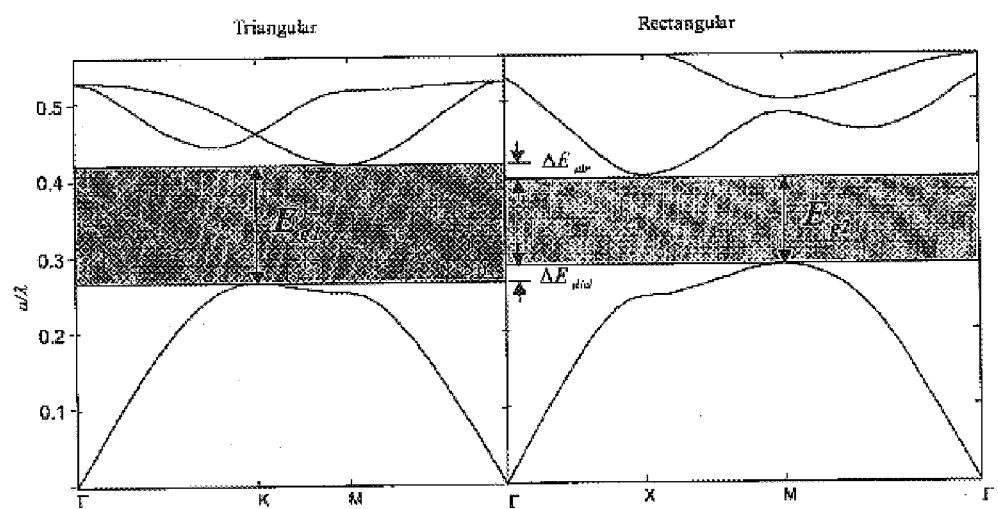
FIG. 2 is a band diagram of a triangular photonic crystal lattice with a bandgap of $E_{g1}$ and a rectangular photonic crystal lattice with a bandgap $E_{g2}$, wherein as both lattices are brought together to form a hetero-structure photonic crystal band edge discontinuities $\Delta E_{diel}$ and $\Delta E_{air}$ start to appear at both the dielectric and air bands respectively.

When photonic crystals of different lattice structures are brought together (for example, rectangular and triangular lattices), discontinuities are expected in their perspective energy bands, since each of the structures will have different bandgaps, as shown in FIG. 2. The discontinuities in the dielectric-band $\Delta E_{diel}$ and the air-band $\Delta E_{air}$ accommodate the difference in bandgap $\Delta E_g$ between the two photonic crystals, where $$\Delta E_g = E_{g1} - E_{g2}. \quad (3)$$

The barriers on either side of the wide bandgap lattice form photonic quantum wells, which are similar to an electronic quantum well in semiconductors. However, in photonic crystals, the bands above and below the bandgap are generally unoccupied and a transition from one Bloch state to another state is only possible if the phase-matching condition is satisfied.

Photonic quantum well (PQW) structures may be fabricated using two photonic crystal structures (hetero-structure), one of which is called a well structure and the other one a barrier structure. Within the PQW, sharp peaks are observed as the quantized states of the single quantum well.

2. Bandgap Optimization Using Photonic Crystal Hetero-structure

Sometimes it is desirable to design a photonic crystal structure that possesses a wide bandgap. Photonic bandgap optimization is usually achieved by optimizing the size of the photonic crystal constituent objects (e.g., ratio of radius to lattice constant, or filling ratio). These have a limit imposed by the geometrical constraint of the structure, as well as the size of its constituent objects, beyond which the structure cannot be optimized any further for these specific parameters. Wide bandgap photonic crystals are advantageous for applications such as, a wideband optical mirror, an optical matching element, and an optical coupler. Hetero-structure photonic crystal offers another alternative for optimizing photonic bandgaps beyond the limit reached by geometrical constraints. In order to achieve this goal, the band structure of the two crystals constructing the hetero-structure should overlap by at least 30% of both bandgaps.

Figures 3A, 3B:
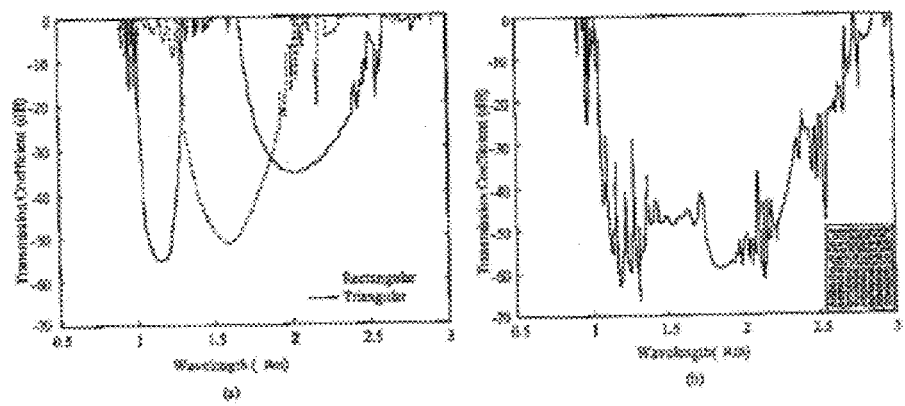
FIG. 3(a) is a graph showing the transmission spectra of a rectangular photonic crystal lattice (dash line) with a bandgap between 1.234 μm–2.172 μm, overlapped with the transmission spectra of triangular photonic crystal lattice (solid line) with a bandgap between 1.0 μm–1.292 μm and 1.696 μm–2.468 μm.
FIG. 3(b) is a graph showing the transmission spectra of a hetero-structure photonic crystal with a bandgap between 1.0 μm and 2.7 μm.

To illustrate this, a rectangular lattice of silicon posts with ($\alpha$=543 nm, r=109 nm) is presented. This structure has a bandgap between $\lambda$=1.234 $\mu$m and $\lambda$=2.172 $\mu$m, shown in FIG. 3(a) by the dashed line, and a bandgap size ($\Delta\lambda/\lambda_{center}$) of 55% for an incident pulse of center wavelength $\lambda$=1.55 $\mu$m and pulse width $\Delta\lambda$=1.1 $\mu$m, for TM polarization. A triangular lattice of silicon posts with ($\alpha$=543 nm, r=163 nm) is then presented. This structure has two bandgaps, one between (1.0 $\mu$m–1.292 $\mu$m) of size 25% and the other one between (1.696 $\mu$m–2.468 $\mu$m) of size 37%, as shown by the solid line in FIG. 3(a). Then both structures are combined to form a hetero-structure photonic crystal lattice, the transmission spectra of which is shown in FIG. 3(b), where a six layer triangular photonic crystal structure with ($\alpha$=543 nm, r=163 nm) is concatenated with another six layer rectangular photonic crystal structure with ($\alpha$=543 nm, r=109 nm).

The transmission characteristics of the hetero-structure may then be studied using the FDTD method. Analyzing the band diagram of the hetero-structure photonic crystal of FIG. 3(b), illustrates that the hetero-structure has a bandgap between (1.0 $\mu$m–2.7 $\mu$m) of size 91.89%, which if compared with the bandgap sizes shown in FIG. 3(a) one can clearly see that the hetero-structure photonic crystal has a much broader bandgap than that obtained from either rectangular or triangular photonic crystal structures separately. This means that the bandgap obtained from the hetero-structure is equivalent to the overlapping of the bandgap of the constituting lattices.

3. Bandgap Matching Using Hetero-structure

As mentioned above, if the lattices constituting the hetero-structure do not have matched bandgap sizes, internal mismatches at the interface between the two lattices will start to appear. By careful design of the lattices constituting the hetero-structure, discontinuities in the dielectric-band as well as in the air-band shown in FIG. 2, for the case of rectangular and triangular lattices, can be minimized, if not completely eliminated. As a result, bandgap matching between two different lattices can be attained. Bandgap matching can be useful for applications where hetero-structure photonic crystals will be used to guide an electromagnetic wave propagating through two different lattices with minimal propagation losses. An application utilizing bandgap matching is presented in the following section.

Techniques for bandgap matching are based on optimizing the design parameters of each photonic crystal structure used to construct the hetero-structure separately. The lattice constant is fixed to maintain lattice constant matching, while varying the radius to lattice constant ratio (r/$\alpha$) for the case of dielectric rods in air background.

For the case of silicon posts arranged in rectangular lattice with (r=109 nm, $\alpha$=543 nm), the transmission spectrum of the structure is obtained using the two-dimensional FDTD method with periodic boundary conditions, using a pulse of center wavelength $\lambda$=1.55 $\mu$m. For TM polarization, the structure has a bandgap between $\lambda_1$=1.234 $\mu$m and $\lambda_2$=2.172 $\mu$m. If the silicon pillars with (r=109 nm, $\alpha$=543 nm) are arranged in an air background triangular lattice, the structure obtained has a bandgap between $\lambda_1$=1.83 $\mu$m and $\lambda_2$=2.00

μm. If the two structures are stacked together to construct a hetero-structure photonic crystal, there would be a mismatch in the air-band ($\Delta E_{air}$=1.183 μm–1.234 μm=51 nm) and in the dielectric-band ($\Delta E_{diel}$=2.00 μm–2.172 μm=172 nm).

Figure 4:
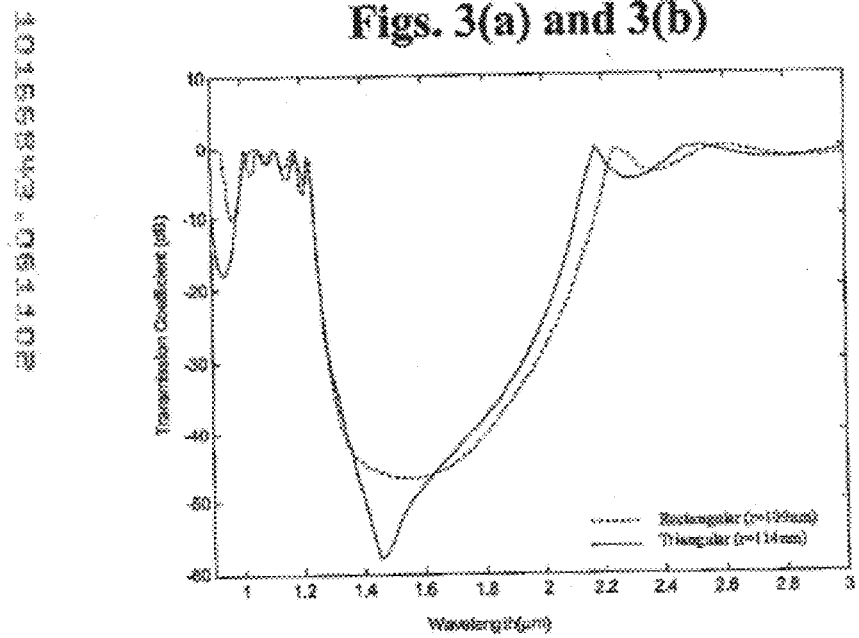
FIG. 4 is a graph showing how a hetero-structure photonic crystal can be used to achieve bandgap matching between a rectangular photonic crystal (dashed line) and a triangular photonic crystal (solid line), both with a lattice constant (a=543 nm)

If silicon pillars with (r=114 nm, α=543 nm) arranged in a triangular lattice with a bandgap between $\lambda_1$=1.241 μm and $\lambda_2$=2.114 μm are stacked with the rectangular structure of (r=109 nm,α=543 nm) to construct a hetero-structure photonic crystal, the mismatch in the air-band would be reduced to ($\Delta E_{air}$=7 nm) and in the dielectric-band to($\Delta E_{diel}$=58 nm). To summarize the analysis presented above, the transmission spectra for a rectangular lattice with (r=109 nm, α=543 nm) and that of a triangular lattice with (r=114 nm, α=543 nm) is plotted in FIG. 4. From FIG. 4 it can be seen that hetero-structure photonic crystals can be used to optically match the transmission spectra of two different lattices and hence minimize the discontinuities in both dielectric and air bands.

4. Hetero-structure Beam Splitter

A hetero-structure beam splitter (also known as a Y Coupler) is similar to the unistructure splitter 10 presented above. However, the wavesplitting section of the unistructure beam splitter was re-engineered by replacing the rectangular lattice in the splitting region with a triangular lattice, by which a hetero-structure beam splitter was created. A hetero-structure, as described previously, combines two different geometrical structures such that a signal propagating through both structures will suffer minimal mismatching and have high transmission efficiency.

The choice of which lattice to be used in a specific part of the device, is based on the fact that, a rectangular lattice is more suited for straight waveguides. However, a rectangular lattice may not be optimal for guiding a signal through a route that does not coincide with a rectangular grid, due to its geometrical constraint, which will lead to bending losses. For the splitting section of the structure, a geometry is needed that is more suited for that particular section. For the angular section of the splitter, a triangular lattice is ideal since it provides a more adiabatic transition between the waveguiding and wavesplitting sections.

Figure 5:
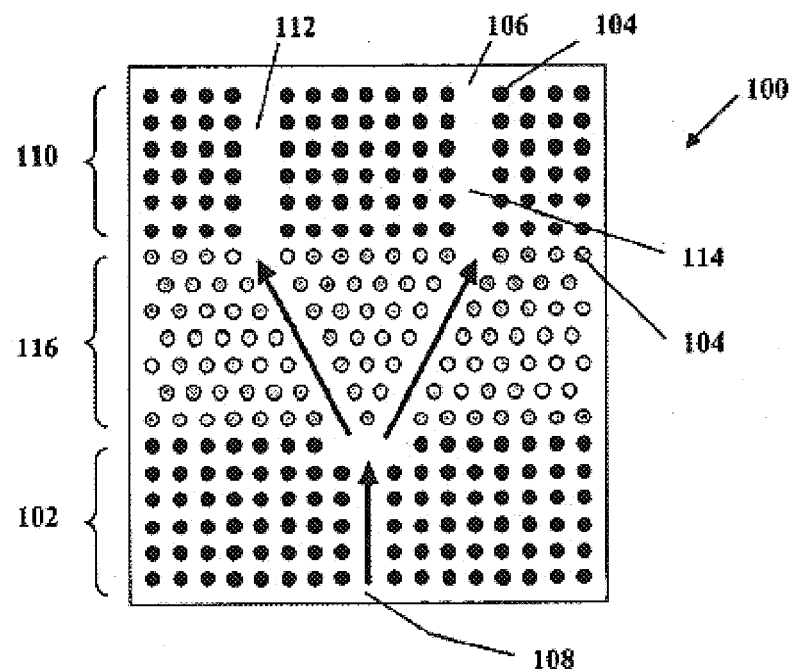
FIG. 5 is a top view of a two-dimensional, hetero-structure photonic crystal that is used as an optical beam splitter in accordance with the preferred embodiment of the present invention.

To design a two-dimensional, hetero-structure photonic crystal 100, in accordance with the preferred embodiment of the present invention and as shown in FIG. 5, a first rectangular lattice array 102 of dielectric rods 104 is provided on a portion of an air background 106. A line defect is formed in first rectangular lattice array 102 by removing one column of dielectric rods 104 from the photonic crystal 100. This creates a main waveguide 108 within photonic crystal 100. A second rectangular lattice array 110 of dielectric rods 104 is provided on another portion of air background 106, the second rectangular lattice array 110 being spaced from the first rectangular lattice array 102. Two line defects are formed in second rectangular lattice array 110 by removing two columns of dielectric rods 104 from photonic crystal 100. This creates a first channel waveguide 112 and second channel waveguide 114 in second rectangular lattice array 110. A triangular lattice array 116 of dielectric rods 104 is provided between first and second rectangular lattice arrays 102, 110. Two line defects are formed in triangular lattice array 110 by removing two dielectric rods 104 from each row of triangular lattice array 110. These line defects optically communicate with first and second channel waveguides 112, 114 and main waveguide 108, and, together with the line defects formed in second rectangular lattice array 110, form the complete first and second channel waveguides 112, 114. This arrangement forms a Y coupler optical beam splitter 100.

A light beam (represented by 100%) traveling through main waveguide 108 is split evenly between first channel waveguide 112 and second channel waveguide 114. Ideally, an optical beam splitter will split a light source evenly, with 50% of the light source traveling through one channel waveguide and 50% of the light source traveling through the other channel waveguide, representing a transmission efficiency of 100%. The present invention shown in FIG. 5 substantially achieves this ideal state with 45% of the light from main waveguide 108 being transmitted through first channel waveguide 112, and 45% of the light from main waveguide 108 being transmitted through second channel waveguide 114. Thus, the two-dimensional, hetero-structure photonic crystal 100 achieves a transmission efficiency as high as 90% in comparison to the transmission efficiency of 50% for the conventional unistructure photonic crystals.

By way of example only and not limitation of the present invention, the modified structure 100 may consist of a waveguiding element 108 formed in a rectangular lattice 102 with (r=109 nm,α=543 nm), wavesplitting elements 117 formed in a triangular lattice 116 with (r=114 nm,α=543 nm), and final waveguiding elements 112, 114 formed in a rectangular lattice 110 with (r=109 nm,α=543 nm) and connected to each branch 117 of the splitter. The splitting section has a more adiabatic change than conventional Cartesian Y couplers, which provides better control over the angular waveguide and achieves a much smoother transition for the optical impedance profile between the two structures. The width of the angular waveguide may be further adjusted to match the width of the straight waveguide for proper impedance matching between the two sections.

In order the test hetero-structure photonic crystal 100, a point source with a frequency profile may be placed within the bandgap of the hetero-structure. A detector may also be placed in each waveguide channel 117 of the splitter to measure the time varying electric field and then compare it to the incident field in the main channel 108. The structure shown in FIG. 5 may be simulated using FDTD with PML boundary conditions, for TM polarization. A pulse of center wavelength $\lambda$=1.55 μm and pulse width $\Delta\lambda$=0.5 μm incident through the main waveguiding element 108 should split ideally between the two branches of the Y coupler. A comparison of the amplitude of the time varying electric field stored at the detectors placed inside each waveguide 117 shows that the transmission efficiency through each channel 117 for frequencies within the bandgap of the structure is close to 45% and the total throughput efficiency is 90% through both channels compared to the incident pulse through the main waveguide 108. The total loss (0.46 dB) of hetero-structure beam splitter 100 is mainly due to bending loss (radiation loss) at the transition between angular and straight waveguides, which can be minimized by further optimizing the corner joints between the angular waveguide (in the triangular lattice 116) and the straight waveguide (in the rectangular lattice 102).

Figure 6:
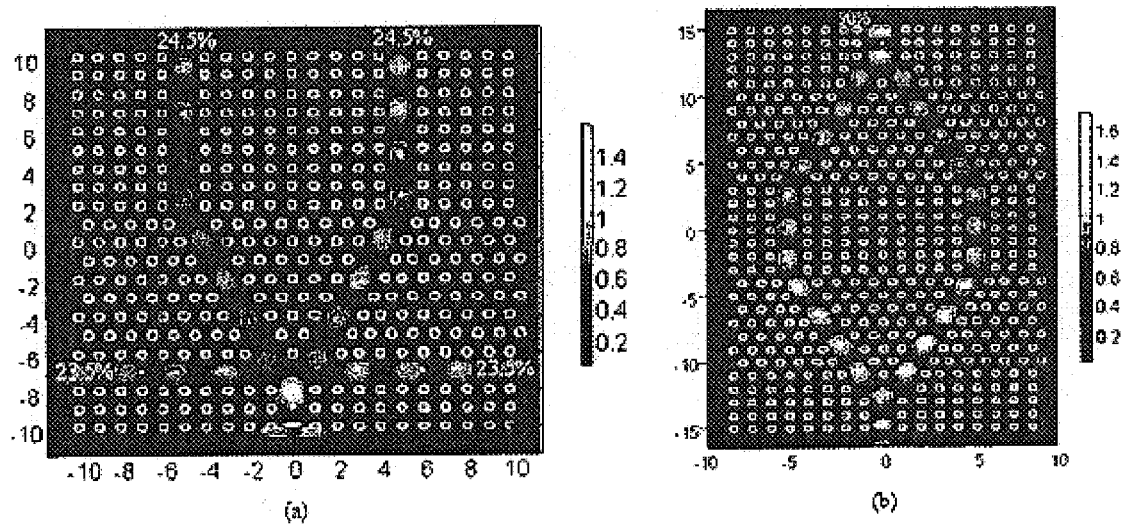
FIG. 6(a) is a top view of an actual two-dimensional, hetero-structure photonic crystal that is used as a four channel optical beam splitter (but having a different configuration than the crystal shown in FIG. 5) in accordance with the preferred embodiment of the present invention.
FIG. 6(b) is a top view of an actual two-dimensional, hetero-structure photonic crystal that is used as an optical beam splitter and combiner in accordance with the preferred embodiment of the present invention.

Other examples of hetero-structure photonic crystals formed in accordance with the teachings of the present invention are shown in FIGS. 6(a) and 6(b). FIG. 6(a) shows a four-way beam splitter where the input signal was divided between four channels with an overall throughput loss of (0.18 dB). FIG. 6(b) shows a hetero-structure beam splitter and combiner through which the reverse operation of splitting through combining the outputs of the Y coupler using another hetero-structure photonic crystal with the same high throughput efficiency 90% was achieved.

The hetero-structure photonic crystal structure of the present invention provides many advantages, including tailoring the bandgap structure of photonic crystals and forming a photonic quantum well (PQW) that can be used to localize photons. The structure of the present invention also enables bandgap optimization beyond the optimizable geometrical design parameters of either lattices separately, and offers a new concept of bandgap matching of two different lattice structures, to minimize or completely eliminate discontinuities in the dielectric-band as well as in the air-band.

It will be apparent to those skilled in the art that various modifications and variations can be made in the two-dimensional hetero-structure photonic crystal of the present invention and in construction of this structure without departing from the scope or spirit of the invention. As an example, although the structure has been shown for use as an optical beam splitter, it may be equally used to create optical beam combiners having high transmission efficiencies.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A two-dimensional, hetero-structure photonic crystal, comprising:

a rectangular lattice array of dielectric rods provided on a portion of an air background; and a triangular lattice array of dielectric rods provided adjacent to said rectangular lattice array, wherein a main waveguide is formed in said rectangular lattice array by removing dielectric rods from portions thereof, and a plurality of splitting channel waveguides are formed in said triangular lattice array by removing dielectric rods from portions thereof, each of the plurality of splitting channel waveguides optically communicating with the main waveguide.

2. A two-dimensional, hetero-structure photonic crystal as recited in claim 1, further comprising:

another rectangular lattice array of dielectric rods provided on another portion of the air background, said another rectangular lattice array being spaced from said rectangular lattice array, wherein said triangular lattice array is provided between said another rectangular lattice array and said rectangular lattice array.

3. A two-dimensional, hetero-structure photonic crystal as recited in claim 2, wherein a plurality of channel waveguides are formed in said another rectangular lattice array by removing dielectric rods from portions thereof, the another plurality of channel waveguides optically communicating with the plurality of splitting channel waveguides.

4. A two-dimensional, hetero-structure photonic crystal as recited in claim 3, further comprising:

another triangular lattice array of dielectric rods provided adjacent to said another rectangular lattice array, wherein a plurality of combining channel waveguides are formed in said another triangular lattice array by removing dielectric rods from portions thereof, each of the plurality of combining channel waveguides optically communicating with the another plurality of channel waveguides.

5. A two-dimensional, hetero-structure photonic crystal as recited in claim 1, wherein another plurality of splitting channel waveguides are formed in said rectangular lattice array by removing dielectric rods from portions thereof, the another plurality of splitting channel waveguides optically communicating with the main waveguide.

6. A method of making a two-dimensional, hetero-structure photonic crystal, comprising:

forming a rectangular lattice array of dielectric rods on a portion of an air background;

forming a triangular lattice array of dielectric rods provided adjacent to said rectangular lattice array;

forming a main waveguide in the rectangular lattice array by removing dielectric rods from portions thereof; and forming a plurality of splitting channel waveguides in the triangular lattice array by removing dielectric rods from portions thereof, each of the plurality of splitting channel waveguides optically communicating with the main waveguide.

7. A method of making a two-dimensional, hetero-structure photonic crystal as recited in claim 6, further comprising:

forming another rectangular lattice array of dielectric rods on another portion of the air background, the another rectangular lattice array being spaced from the rectangular lattice array, wherein the triangular lattice array is provided between the another rectangular lattice array and the rectangular lattice array.

8. A method of making a two-dimensional, hetero-structure photonic crystal as recited in claim 7, further comprising:

forming a plurality of channel waveguides in the another rectangular lattice array by removing dielectric rods from portions thereof, the another plurality of channel waveguides optically communicating with the plurality of splitting channel waveguides.

9. A method of making a two-dimensional, hetero-structure photonic crystal as recited in claim 8, further comprising:

forming another triangular lattice array of dielectric rods adjacent to the another rectangular lattice array; and forming a plurality of combining channel waveguides in the another triangular lattice array by removing dielectric rods from portions thereof, each of the plurality of combining channel waveguides optically communicating with the another plurality of channel waveguides.

10. A method of making a two-dimensional, hetero-structure photonic crystal as recited in claim 6, further comprising:

forming another plurality of splitting channel waveguides in the rectangular lattice array by removing dielectric rods from portions thereof, the another plurality of splitting channel waveguides optically communicating with the main waveguide.

* * * * *